(12) United States Patent
Hou

(10) Patent No.: US 12,092,463 B2
(45) Date of Patent: Sep. 17, 2024

(54) REAL-TIME DISPLAY METHOD, DEVICE, SYSTEM AND STORAGE MEDIUM OF THREE-DIMENSIONAL POINT CLOUD

(71) Applicant: SZ DJI TECHNOLOGY CO., LTD., Shenzhen (CN)

(72) Inventor: Yuhan Hou, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 220 days.

(21) Appl. No.: 17/673,781

(22) Filed: Feb. 16, 2022

(65) Prior Publication Data
US 2022/0170746 A1    Jun. 2, 2022

Related U.S. Application Data

(63) Continuation of application No. PCT/CN2019/105733, filed on Sep. 12, 2019.

(51) Int. Cl.
*G06F 17/00* (2019.01)
*G01C 21/00* (2006.01)
(Continued)

(52) U.S. Cl.
CPC ....... *G01C 21/005* (2013.01); *G06F 3/04817* (2013.01); *G06T 11/00* (2013.01);
(Continued)

(58) Field of Classification Search
CPC ..... G01C 21/005; G06T 11/00; G06T 17/005; G06T 2200/24; H04N 23/695
(Continued)

(56) References Cited

U.S. PATENT DOCUMENTS

| 10,120,377 | B2 | 11/2018 | Lai et al. |
| 11,644,839 | B2* | 5/2023 | Zhao ............... G05D 1/0088 |
| | | | 701/3 |

(Continued)

FOREIGN PATENT DOCUMENTS

| CN | 106931944 A | 7/2017 |
| CN | 107341851 A | 11/2017 |

(Continued)

OTHER PUBLICATIONS

Morrish, Publishing Ponit Cloud Scene Layers in ArcGIS Pro, May 21, 2018 (Year: 2018).*
(Continued)

*Primary Examiner* — Matthew Ell
*Assistant Examiner* — Matthew J Ludwig
(74) *Attorney, Agent, or Firm* — ANOVA LAW GROUP, PLLC

(57) ABSTRACT

A real-time display method, device, system, and storage medium for a three-dimensional point cloud can include: displaying a flight route corresponding to a target shooting area of an unmanned aerial vehicle; acquiring a current position of the unmanned aerial vehicle and an image captured by an image capturing device of the unmanned aerial vehicle; based upon the image, determining a three-dimensional point cloud corresponding to at least a portion of the target shooting area; and displaying synchronously the current position of the unmanned aerial vehicle and the three-dimensional point cloud while the unmanned aerial vehicle moves according to the flight route, where a display icon corresponding to the current position is located on the flight route.

20 Claims, 14 Drawing Sheets

(51) Int. Cl.
  *G06F 3/04817* (2022.01)
  *G06T 11/00* (2006.01)
  *G06T 17/00* (2006.01)
  *H04N 23/695* (2023.01)

(52) U.S. Cl.
  CPC .......... *G06T 17/005* (2013.01); *H04N 23/695* (2023.01); *G06T 2200/24* (2013.01)

(58) Field of Classification Search
  USPC .......................................................... 701/428
  See application file for complete search history.

(56) References Cited

U.S. PATENT DOCUMENTS

| | | | | |
|---|---|---|---|---|
| 2016/0371984 | A1* | 12/2016 | Macfarlane | G01C 21/20 |
| 2017/0110014 | A1* | 4/2017 | Teng | G08G 5/0086 |
| 2018/0204469 | A1* | 7/2018 | Moster | G01C 11/02 |
| 2019/0383926 | A1* | 12/2019 | Crouch | G01S 17/26 |
| 2020/0135036 | A1* | 4/2020 | Campbell | G08G 5/0091 |
| 2020/0387741 | A1* | 12/2020 | Bach | G06V 20/13 |
| 2021/0012669 | A1* | 1/2021 | Beaurepaire | G08G 5/0091 |
| 2021/0132621 | A1* | 5/2021 | Ferren | G06V 20/56 |
| 2023/0334850 | A1* | 10/2023 | Harvey | G06T 17/005 |

FOREIGN PATENT DOCUMENTS

| | | |
|---|---|---|
| CN | 108646770 A | 10/2018 |
| CN | 108701373 A | 10/2018 |
| CN | 108804675 A | 11/2018 |
| CN | 109961497 A | 7/2019 |

OTHER PUBLICATIONS

Fedorenko, Global UGV Path Planning on Point Cloud Maps Created by UAV, IEEE, 2018 (Year: 2018).*

DJIFlightPlanner Video Tutorial #1—Introduction to area-based flight planning (Screenshot 1) (Year: 2017).*

International Search Report and Written Opinion mailed on Jun. 16, 2020, received for PCT Application PCT/CN2019/105733, Filed on Sep. 12, 2019, 8 pages including English Translation.

* cited by examiner

REAL-TIME DISPLAY METHOD, DEVICE, SYSTEM AND STORAGE MEDIUM OF THREE-DIMENSIONAL POINT CLOUD

CROSS-REFERENCE TO RELATED APPLICATION

The present application is a continuation of International Application No. PCT/CN2019/105733, filed Sep. 12, 2019, the entire contents of which being incorporated herein by reference in its entirety.

TECHNICAL FIELD

The present disclosure relates to the technical field of surveying and mapping, and particularly relates to a real-time display method, device, system, and storage medium regarding a three-dimensional point cloud.

BACKGROUND

In the field of surveying and mapping, a generated point cloud may only be able to be viewed after the reconstruction of the entire scene or object is completed, so a user may not be able to inspect the reconstruction effect in real time and may not be able to determine in time which areas in the scene or object have good reconstruction effects and which areas are not reconstructed. To view the effect of reconstruction, the user may be required to wait until the reconstruction of the entire scene is completed, which can cause the following problems: 1. to inspect any point cloud of the scene, the user may be required to wait for the reconstruction of the entire scene to be completed, which can often take a relatively large amount of time because the point cloud can only be inspected after the entire scene is reconstructed. The reconstruction of the scene can often take a relatively long time, for instance, ranging from tens of minutes to several days; 2. the effect of model reconstruction may not be able to be inspected at the first time (such as during pictures are collected on site), and the efficiency may be relatively low. During a surveying and mapping operation, it is often found that some places may not be able to be reconstructed due to poor shooting and images may need to be collected again after leaving the site and going back for reconstruction for a long time. This can require returning to the shooting site for re-shooting, which can waste manpower and time cost. 3. waiting for the reconstruction of the entire scene to be completed before allowing the user to view the point cloud may result in a bad user experience SUMMARY The present disclosure provides a real-time display method, device, system, and storage medium of a three-dimensional point cloud. The real-time display of the three-dimensional point cloud can be realized in the process of collecting images by an image capturing device of an unmanned aerial vehicle, so that a user can inspect the three-dimensional point cloud in real time to improve operation efficiency.

According to a first aspect of the present disclosure, a real-time display method regarding a three-dimensional point cloud is provided or implemented, the real-time display method may include: displaying, on a display, using a processor, a flight route corresponding to a target shooting area of an unmanned aerial vehicle; acquiring, using the processor, a current position of the unmanned aerial vehicle and an image captured by an image capturing device of the unmanned aerial vehicle; determining, using the processor, based upon the image, a three-dimensional point cloud corresponding to at least a portion of the target shooting area and while the unmanned aerial vehicle is moving according to the flight route, displaying, on the display, synchronously the current position of the unmanned aerial vehicle and the three-dimensional point cloud, wherein a display icon corresponding to the current position is located on the flight route.

According to a second aspect of the present disclosure, a real-time display device regarding a three-dimensional point cloud is provided or implemented. The real-time display device may include a memory and a processor (e.g., processing circuitry). The memory has stored a program therein; the processor can be configured to execute the program stored in the memory and, when executing the program, the processor can be configured to: display a flight route corresponding to a target shooting area of an unmanned aerial vehicle; acquire a current position of the unmanned aerial vehicle and an image captured by an image capturing device of the unmanned aerial vehicle; determine, based upon the image, a three-dimensional point cloud corresponding to at least a portion of the target shooting area; and while the unmanned aerial vehicle is moving according to the flight route, display synchronously the current position of the unmanned aerial vehicle and the three-dimensional point cloud, wherein a display icon corresponding to the current position is located on the flight route.

According to a third aspect of the present disclosure, a real-time display system regarding a three-dimensional point cloud is provided or implemented. The real-time display system may include: an unmanned aerial vehicle equipped with an image capturing device for photographing an environment to obtain an image; and the real-time display device of a three-dimensional point cloud of the second aspect described above.

According to a fourth aspect of the present disclosure, a computer-readable storage medium (non-transitory) having stored a computer program therein is provided or implemented. When the computer program is executed by a processor (e.g., processing circuitry), the steps of the real-time display method described in the first aspect of the present disclosure are implemented.

BRIEF DESCRIPTION OF THE DRAWINGS

In order to explain the technical features of embodiments of the present disclosure more clearly, the drawings used in the present disclosure are briefly introduced as follow. Obviously, the drawings in the following description are some exemplary embodiments of the present disclosure. Ordinary person skilled in the art may obtain other drawings and features based on these disclosed drawings without inventive efforts.

DETAILED DESCRIPTION

Figure 1:
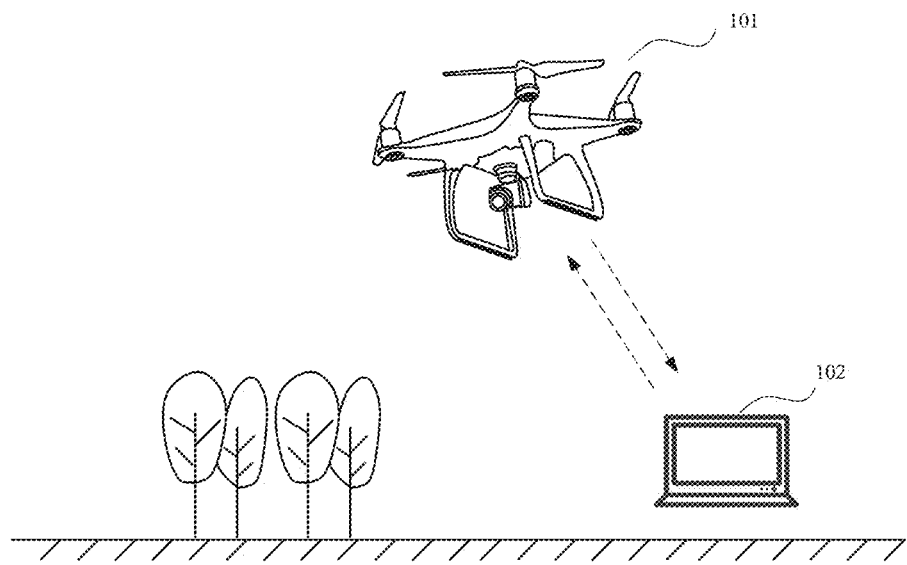
FIG. 1 illustrates a schematic diagram of a surveying and mapping scene of an unmanned aerial vehicle according to some embodiments of the present disclosure.

Technical solutions and technical features encompassed in the exemplary embodiments of the present disclosure will be described in detail in conjunction with the accompanying drawings in the exemplary embodiments of the present disclosure. Apparently, the described exemplary embodiments are part of embodiments of the present disclosure, not all of the embodiments. Based on the embodiments and examples disclosed in the present disclosure, all other embodiments obtained by those of ordinary skill in the art without inventive efforts shall fall within the protection scope of the present disclosure.

Here, exemplary embodiments will be described in detail, and examples thereof are shown in the accompanying drawings. The implementation manners described in the following exemplary embodiments do not represent all implementation manners consistent with the present disclosure. On the contrary, they are only examples of devices and methods consistent with some aspects of the disclosure as detailed in the appended claims. Further, the chart(s) and diagram(s) shown in the drawings are only examples, and does not necessarily include all components, elements, contents and/or operations/steps, nor does it have to be arranged in the described or specific order. For example, some components/elements can also be disassembled, combined, or partially combined; therefore, the actual arrangement may be changed or modified according to actual conditions. In the case of no conflict, the components, elements, operations/steps and other features disclosed in the embodiments may be combined with each other.

FIG. 1 illustrates a schematic diagram of a surveying and mapping scene of an unmanned aerial vehicle according to some embodiments of the present disclosure. An unmanned aerial vehicle surveying and mapping system may include an unmanned aerial vehicle 101 and a ground station 102. The unmanned aerial vehicle 101 may be an unmanned aerial vehicle that performs a surveying and mapping task. In certain embodiments, the unmanned aerial vehicle 101 may be a multi-rotor unmanned aerial vehicle, for example, a quadrotor unmanned aerial vehicle, a hexarotor unmanned aerial vehicle, an octorotor unmanned aerial vehicle, or the like; in certain embodiments, the unmanned aerial vehicle 101 may be a vertical take-off and landing unmanned aerial vehicle, the vertical take-off and landing unmanned aerial vehicle is provided with a rotor power system and a fixed-wing power system; in certain embodiments, the unmanned aerial vehicle 101 may also be a fixed-wing unmanned aerial vehicle. The ground station 102 may be a remote control, a smart phone, a tablet computer, a ground control station, a laptop computer, a watch, a bracelet, etc. or any combination thereof.

In some embodiments, the ground station 102 may be a PC ground station as shown in FIG. 1. The ground station 102 may display a flight route corresponding to a target shooting area of the unmanned aerial vehicle 101 and acquire a current position of the unmanned aerial vehicle 101 and an image captured by an image capturing device of the unmanned aerial vehicle 101. The ground station 102 can determine a three-dimensional point cloud corresponding to at least a portion of the target shooting area based upon the image, and can synchronously display the current position of the unmanned aerial vehicle 101 and the three-dimensional point cloud while the unmanned aerial vehicle 101 moves according to the flight route, where a display icon corresponding to the current position is located on the flight route.

By displaying the flight route corresponding to the target shooting area of the unmanned aerial vehicle, acquiring the current position of the unmanned aerial vehicle and the image captured by the image capturing device of the unmanned aerial vehicle, determining the three-dimensional point cloud corresponding to the at least a portion of the target shooting area based upon the image, and displaying synchronously the current position of the unmanned aerial vehicle and the three-dimensional point cloud while the unmanned aerial vehicle moves according to the flight route, and the ground station 102 may display the three-dimensional point cloud reconstructed three-dimensionally in real time, for instance, so that a surveying and mapping personnel can inspect the three-dimensional point cloud in real time, which can improve the efficiency of surveying and mapping.

In some embodiments, the real-time display method of three-dimensional point cloud provided in the present disclosure may be executed by a ground station (e.g., ground station 102) in an unmanned aerial vehicle surveying and mapping system, and in particular, may be executed by a real-time display device of a three-dimensional point cloud on the ground station 102. In certain embodiments, the real-time display device of the three-dimensional point cloud may be disposed on a terminal device (for example, a smart phone, a tablet computer, a laptop computer, etc.). In certain embodiments, the unmanned aerial vehicle 101 can include an image capturing device, and the image capturing device can be used to photograph or video an environment to obtain an image. In certain embodiments, the image capturing device may include, but is not limited to, a visible light camera, a thermal imaging camera, or the like. In other embodiments, the real-time display method of the three-dimensional point cloud may also be applied to other mobile devices, such as unmanned robots (for example, robots, unmanned vehicles, unmanned ships, etc., capable of moving autonomously) or handheld equipment (for example, handheld pan-tilt camera).

The real-time display method for a three-dimensional point cloud provided in the present disclosure will be schematically described below in conjunction with the accompanying drawings.

Figure 2:
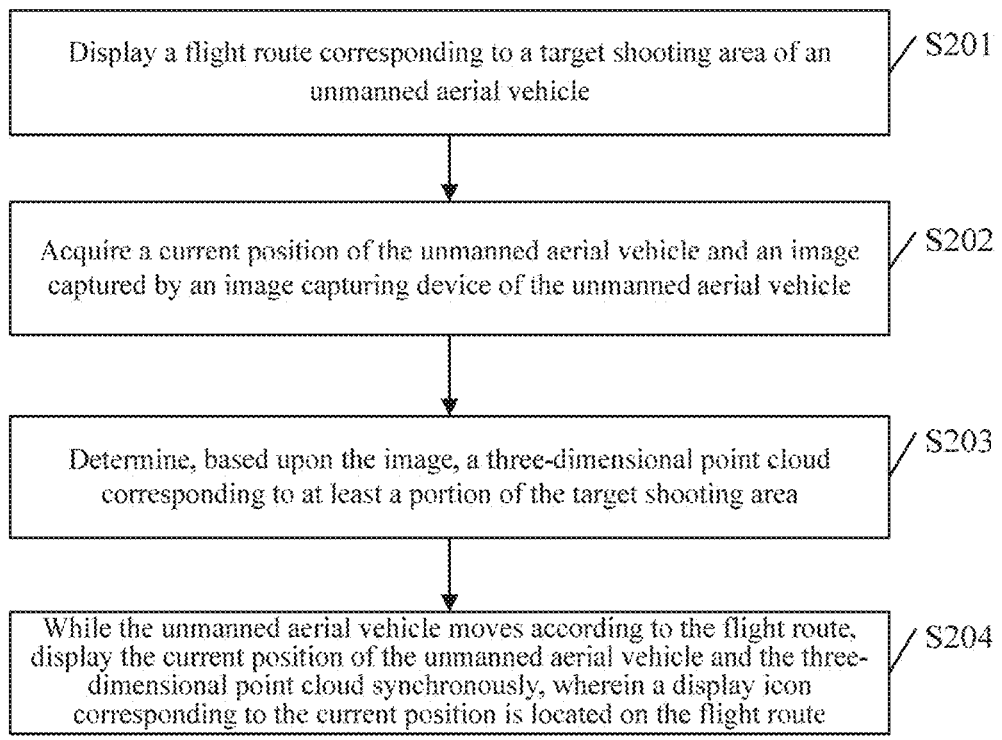
FIG. 2 illustrates a schematic flowchart of a real-time display method of a three-dimensional point cloud according to some embodiments of the present disclosure.

FIG. 2 illustrates a schematic flowchart of a real-time display method of a three-dimensional point cloud according to some embodiments of the present disclosure. The real-time display method may be executed by a real-time display device for a three-dimensional point cloud. The specific explanation of the real-time display device is as described above. In particular, the real-time display method of the present disclosure may include steps S201 to S204. Some or all of the steps of the method can be performed using or by one or more processors, which may be implemented in or using circuitry, of a real-time display device.

Step S201 may include displaying a flight route corresponding to a target shooting area of an unmanned aerial vehicle, such as unmanned aerial vehicle 101.

In some embodiments, a real-time display device of a three-dimensional point cloud may display the flight route corresponding to the target shooting area of the unmanned aerial vehicle 101.

In one embodiment, the real-time display device of the three-dimensional point cloud may display a two-dimensional map before displaying the flight route corresponding to the target shooting area of the unmanned aerial vehicle 101 and determine the target shooting area based upon a point selection operation of a user on the two-dimensional map, thereby generating the flight route corresponding to the target shooting area.

In one embodiment, the real-time display device of the three-dimensional point cloud may acquire the point selection operation of the user on the two-dimensional map when determining the target shooting area based upon the point selection operation of the user on the two-dimensional map, determine at least three boundary points based upon the point selection operation, and further determine the target shooting area based upon the at least three boundary points, and the target shooting area can be formed by connecting the at least three boundary points in pairs. As such, the user can independently determine the target shooting area, and the flexibility of determining the target shooting area can be improved.

Figure 3A:
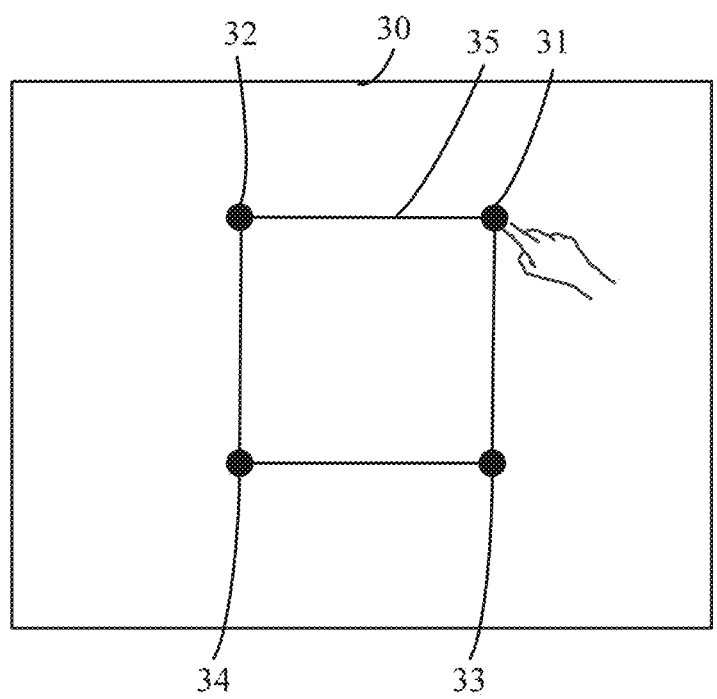
FIG. 3a illustrates a schematic diagram of determining a target shooting area according to some embodiments of the present disclosure.

Taking FIG. 3a as an example, FIG. 3a illustrates a schematic diagram of determining a target shooting area according to some embodiments of the present disclosure. As shown in FIG. 3a, a user can perform a point selection operation on a two-dimensional map 30 to determine boundary points (e.g., four boundary points), which can be respectively a boundary point 31, a boundary point 32, a boundary point 33, and a boundary point 34. The real-time display device of the three-dimensional point cloud can form a closed target shooting area 35 based upon the boundary points of the boundary point 31, the boundary point 32, the boundary point 33, and the boundary point 34, which can be connected in pairs.

In some embodiments, the real-time display device of the three-dimensional point cloud may acquire shooting control information input by a user when generating the flight route corresponding to the target shooting area, and the shooting control information may include one or more of a relative height, a mission height, an overlap ratio, a main route angle and a margin, and the flight route corresponding to the target shooting area is generated based upon the shooting control information. As such, the user can independently set the shooting control information to determine the flight route.

In certain embodiments, the relative height may be defined or characterized as a distance between a takeoff plane of the unmanned aerial vehicle 101 and a plane where the target shooting area is located; the mission height may be defined or characterized as a distance between a plane where the flight route is located and the plane where the target shooting area is located; a starting plane for computing the overlap ratio may be defined or characterized as the plane where the target shooting area is located; the overlap ratio can include a heading overlap ratio and a side overlap ratio, the heading overlap ratio can be an image overlap ratio corresponding to a main route, the side overlap ratio can be an image overlap ratio corresponding to adjacent main routes; the main route angle can be an angle between the main route and a reference direction; and the margin can be defined or characterized as a distance of a starting point (denoted as "S" in FIGS. 3b-3d and FIG. 5) or an ending point (denoted as "E" in FIGS. 3b-3d and FIG. 5) of the flight route with respect to a boundary of the target shooting area.

In one embodiment, the main route angle can be an angle between the main route and the true north direction.

In certain embodiments, the two-dimensional map can include a setting area, and the setting area can include controls to set shooting control information, and a user can input the shooting control information through these controls. In one embodiment, the controls can include any one or more of a relative height control, a mission height control, a heading overlap ratio control, a side overlap ratio control, a main route angle control, and a margin control.

In certain embodiments, the shooting control information, namely one or more of a relative height, a mission height, an overlap ratio, a main route angle and a margin, are all set with default values, and the real-time display device of the three-dimensional point cloud, can adjust the default values based upon an operation of a user.

Figure 3B:
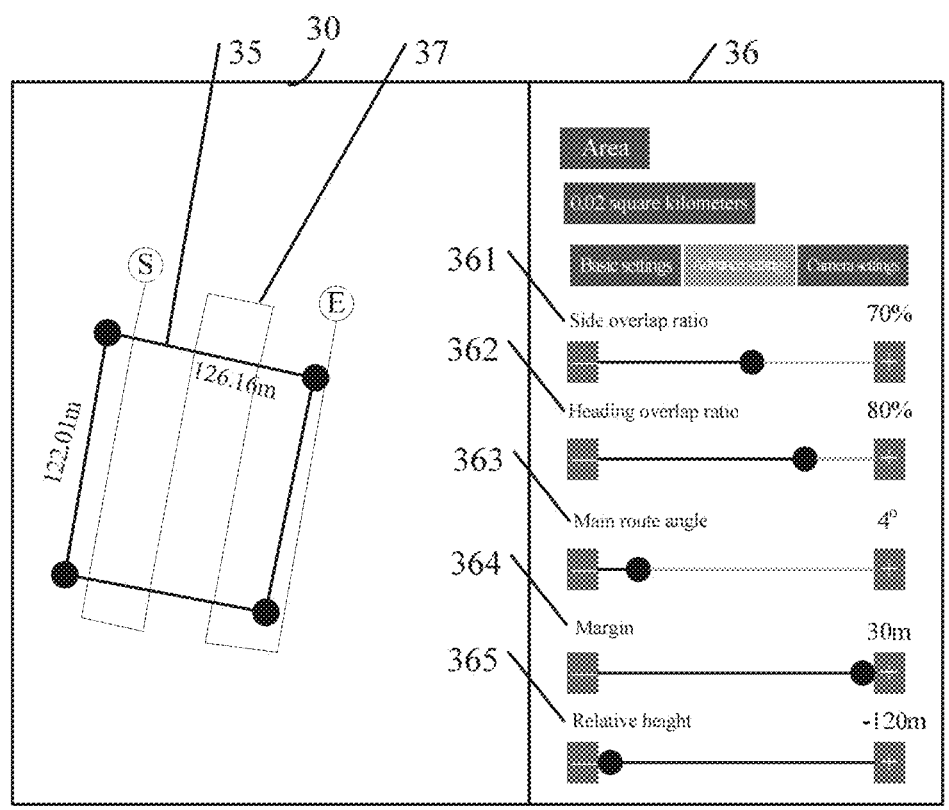
FIG. 3b illustrates a schematic diagram of generating a flight route according to some embodiments of the present disclosure.

Taking illustrative FIG. 3b as an example, FIG. 3b illustrates a schematic diagram of generating a flight route according to some embodiments of the present disclosure. As shown in FIG. 3b, a two-dimensional map 30 can include a setting area 36. A user may input a side overlap ratio through a side overlap ratio control 361, may input a heading overlap ratio through a heading overlap ratio control 362, may input a main route angle through a main route angle control 363, may input a margin through a margin control 364, and may input a relative height through a relative height control 365. The user can also input a mission height through a mission height control in an interface of basic settings. For example, in one embodiment, as shown in FIG. 3b, for instance, the margin can be set to a maximum of 30 m through the margin control 364, the relative height can be set to −120 m, the main route angle can be set to 4, the heading overlap ratio can be set to 80%, and the side overlap ratio can be set to 70%. Then, a flight route 37 corresponding to a target shooting area 35 can be generated based upon the side overlap ratio, the heading overlap ratio, the main route angle, the margin, the mission height, and the relative height.

Figure 3C:
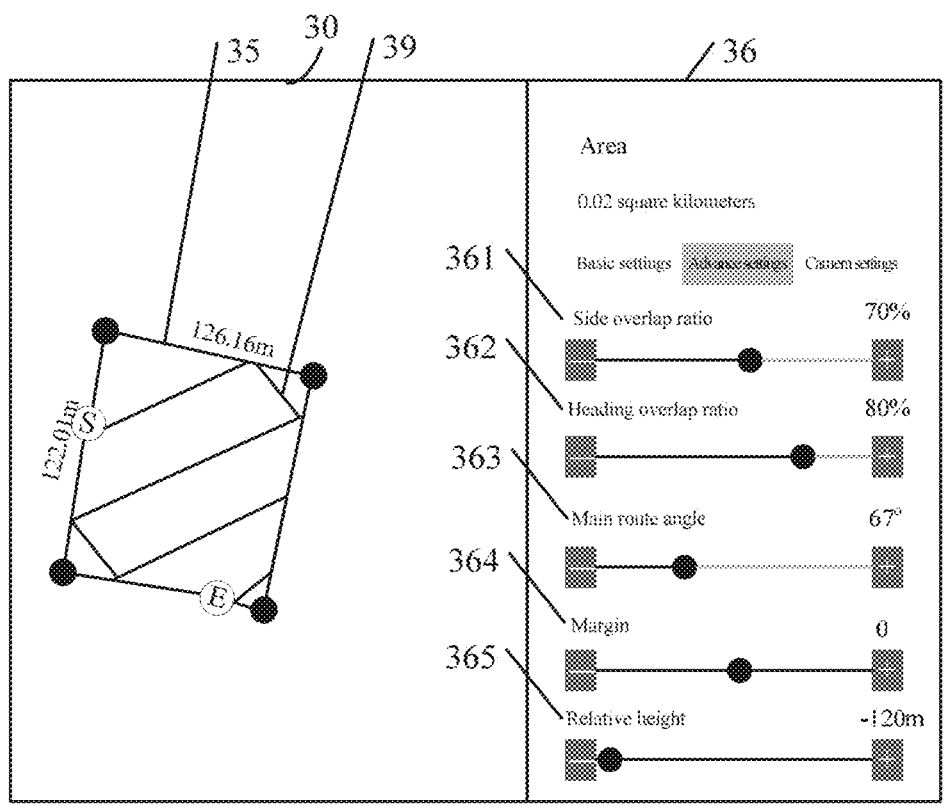
FIG. 3c illustrates another schematic diagram of generating a flight route according to some embodiments of the present disclosure.

For another example, based on FIG. 3b, for instance, keeping the side overlap ratio, the heading overlap ratio, the relative height, and the mission height unchanged, setting the main route angle to 67° and the margin to 0 m, based upon the side overlap ratio, the heading overlap ratio, the main route angle, the margin, the mission height, and the relative height, a flight course 39 corresponding to the target shooting area 35 can be generated as shown in FIG. 3c, for instance, where FIG. 3c illustrates another schematic diagram of generating a flight route according to some embodiments of the present disclosure.

In some embodiments, the plane where the flight route is located can be determined based upon the relative height and the mission height, and a distance between adjacent main routes in the flight route can be determined based upon the side overlap ratio.

In certain embodiments, the flight route can include a plurality of flight routes, and the real-time display device of the three-dimensional point cloud may also display a route switching icon, and switch to and display different flight routes according to an operation of a user on the route switching icon. In some embodiments, the flight route may include a first-type flight route and a second-type flight route. When the unmanned aerial vehicle is flying according to the first-type route, an attitude of the image capturing device can be downward, when the unmanned aerial flight is flying according to the second type of route, an attitude of the image capturing device can be toward the target shooting area and can have an inclination angle. In some embodiments, a relative position between the second type of flight route and the first type of flight route can be determined based upon the inclination angle and the mission height.

Figure 3D:
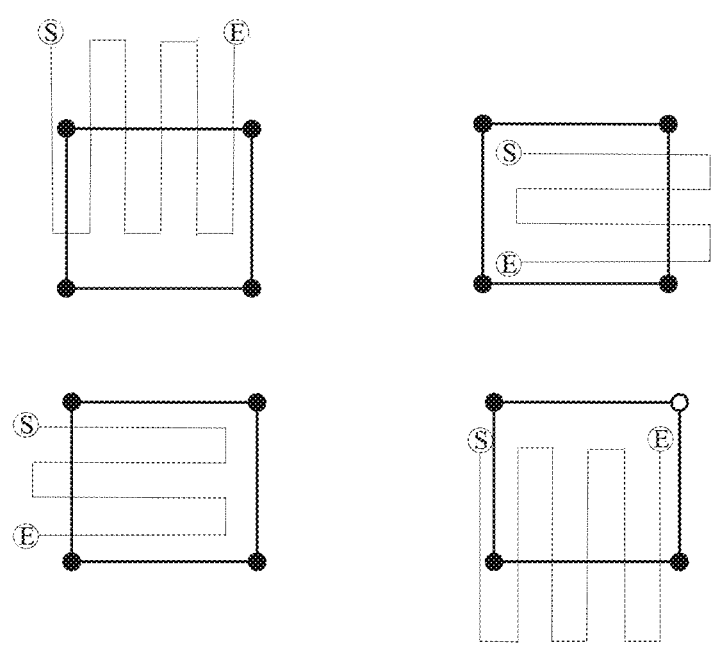
FIG. 3d illustrates a schematic diagram of a plurality of flight routes according to some embodiments of the present disclosure.

In one embodiment, the number of the flight routes can be plural, for instance, five (5), and directions of the plural flight routes can be different. Among them, a middle flight route (the middle flight route of five flight routes) can be the first type of flight route, and the attitude of the corresponding image capturing device of the unmanned aerial vehicle can be downward, and the nose direction of the unmanned aerial vehicle can be the same as the direction of the flight route. The flight routes in the remaining directions (e.g., the remaining four directions) can be the second type of flight routes, the attitude of the corresponding image capturing device of the unmanned aerial vehicle can be to face the target shooting area with an inclination angle, and the nose of the unmanned aerial vehicle can face the target shooting area. For example, the flight routes of the remaining directions (e.g., the remaining four directions) can be as shown in FIG. 3d, which illustrates a schematic diagram of flight routes according to some embodiments of the present disclosure.

Thus, the image capturing device can be tilted to shoot, so that the side of the target shooting area can be photographed. In this way, the point cloud on the side of the target shooting area may not appear empty, which can make the three-dimensional point cloud more complete.

Figure 4A:
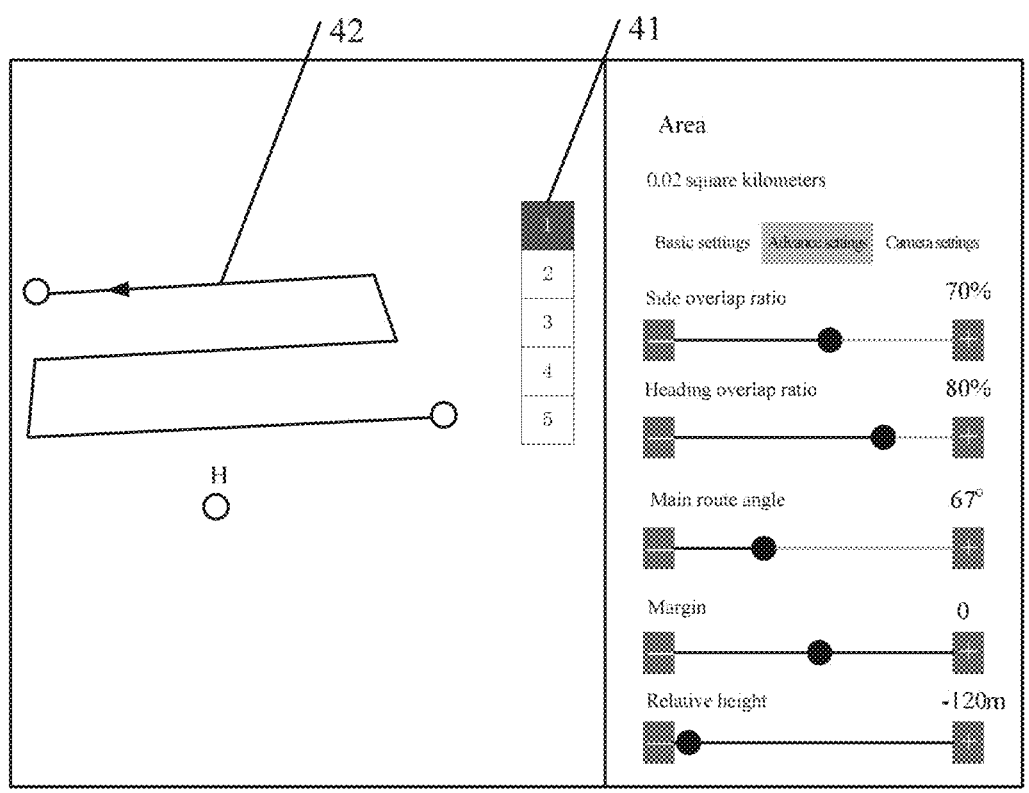
FIG. 4a illustrates a schematic diagram of switching flight routes according to some embodiments of the present disclosure.

FIG. 4a illustrates a schematic diagram of switching flight routes according to some embodiments of the present disclosure. As shown in FIG. 4a, the interface can include a route switching icon area 41. The route switching icon area 41 can include 5 route switching icons 1, 2, 3, 4, and 5, for instance. A user can select (e.g., via clicking on) the route switching icon 1, and a flight route 42 corresponding to the clicked route switching icon can be displayed. The flight route 42 may be the first type of flight route, and the attitude of the corresponding image capturing device of the unmanned aerial vehicle can be downward, where the arrow can be a display icon corresponding to the current position of the unmanned aerial vehicle, showing which position of the flight route the unmanned aerial vehicle is currently flying to; H can be representative of the take-off position of the unmanned aerial vehicle, that is, the location of the Home point, which may display a relative position relationship between the take-off position of the unmanned aerial vehicle and the current position. Specifically, a distance between a plane where the Home point is located and a plane where the flight route is located can be obtained through the relative height and the mission height.

Figure 4B:
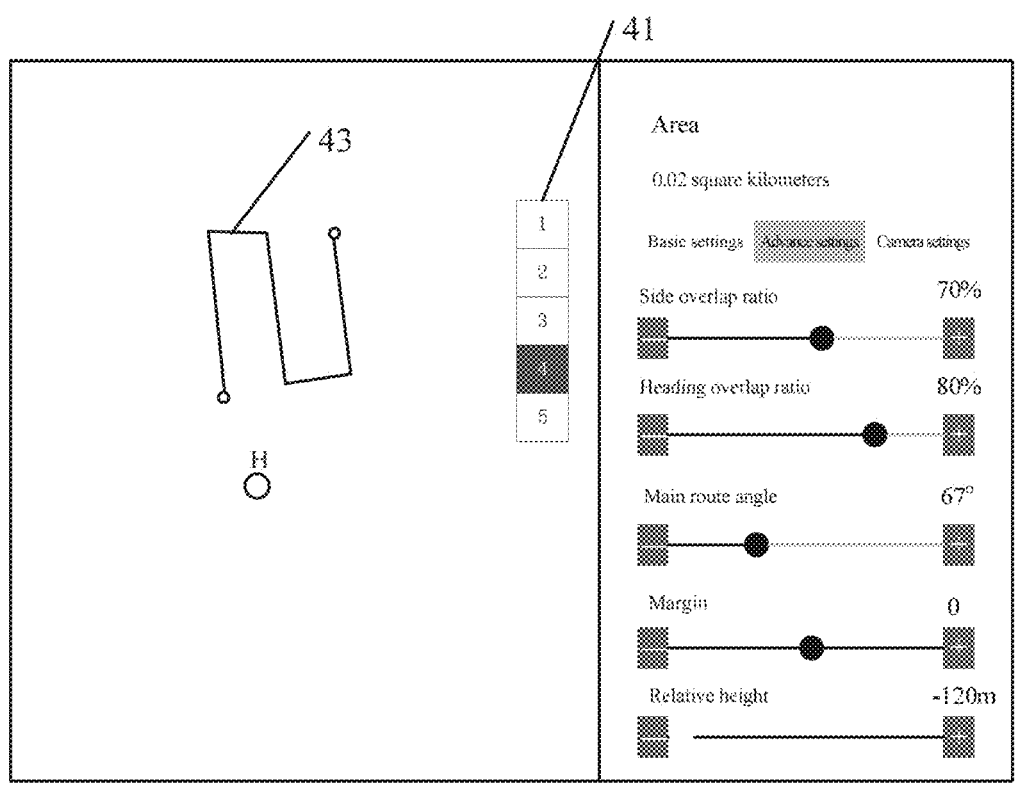
FIG. 4b illustrates another schematic diagram of switching flight routes according to some embodiments of the present disclosure.

For another example, suppose that based on FIG. 4a, the user clicks on the route switching icon 4, and a flight route 43 corresponding to the route switching icon 4 can be output as shown in FIG. 4b. FIG. 4b illustrates another schematic diagram of switching flight routes according to some embodiments of the present disclosure. The flight route 43 may be the second type of flight route. The attitude of the corresponding image capturing device of the unmanned aerial vehicle can be toward the target shooting area and can have an inclination angle, and the nose of the unmanned aerial vehicle can be facing the target shooting area.

In one embodiment, in the process of displaying the three-dimensional point cloud in real time, the unmanned aerial vehicle can fly according to the flight route 42, for instance, as shown in FIG. 4a. When the user clicks the route switch icon 4 to view another flight route 43, the unmanned aerial vehicle may not be triggered to fly according to the flight route 43.

In another embodiment, in the process of displaying the three-dimensional point cloud in real time, the unmanned aerial flight can fly according to the flight route 42, for instance, as shown in FIG. 4a. When the user selects (e.g., clicks on) the route switch icon 4 to view another flight route 43, such selection can trigger the unmanned aerial vehicle to fly according to the flight route 43 after the current flight according to the flight route 42 is complete, that is, the user can select the next flight route by selecting (e.g., clicking on) the route switch icon 4.

In yet another embodiment, in the process of displaying the three-dimensional point cloud in real time, the unmanned aerial vehicle can fly according to the flight route 42, for instance, as shown in FIG. 4a. When the user selects (e.g., clicks on) the route switch icon 4 to view another flight route 43, the unmanned aerial vehicle can be triggered to fly according to the flight route 43 immediately, that is, the user may select (e.g., click on) the route switch icon 4 to make the unmanned aerial vehicle fly to another flight route 43.

In one embodiment, the real-time display device of the three-dimensional point cloud can also display a three-dimensional map of the target shooting area and display the current position of the unmanned aerial vehicle in the three-dimensional map. In this way, in a stage when the unmanned aerial vehicle flies to the starting point of the flight route, that is, a stage where the three-dimensional point cloud has not yet been reconstructed, the user can refer to the three-dimensional map to view the current position of the unmanned aerial vehicle, for instance, so as to further improve the safety of the unmanned aerial vehicle in performing surveying and mapping tasks.

In one embodiment, the three-dimensional map may be pre-stored in the real-time display device, and specifically the three-dimensional map may be a three-dimensional satellite map.

In certain embodiments, the real-time display device of the three-dimensional point cloud may also display a coverage area corresponding to a plurality of flight routes and a satellite map containing the coverage area, where the coverage area can be larger than the target shooting area. In one embodiment, the coverage area can be determined based upon an area covered by each flight route. By determining the coverage area and displaying the coverage area through the satellite map, a user can see obstacles in the coverage area more clearly, so that the user can adjust the shooting control information or the boundary points of the target shooting area according to an actual situation, for instance, so as to prevent the unmanned aerial vehicle from colliding with obstacles when performing tasks to improve safety.

Figure 5:
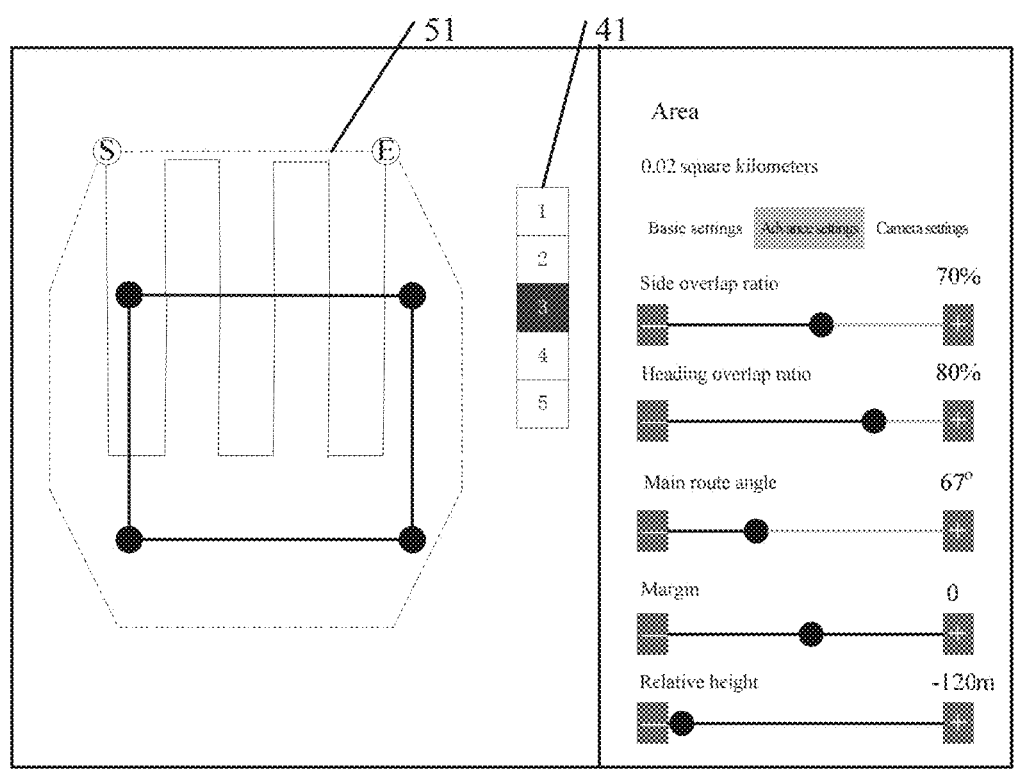
FIG. 5 illustrates a schematic diagram of a satellite map displaying a coverage area according to some embodiments of the present disclosure.

Taking FIG. 5 as an example for illustration, FIG. 5 illustrates a schematic diagram of a satellite map displaying a coverage area according to some embodiments of the present disclosure. As shown in FIG. 5, a coverage area 51 can be determined by an area covered by multiple flight routes (e.g., five (5)) determined by a corresponding number of route switching icons, in this example, five (5), route switching icons 1, 2, 3, 4, and 5 in a route switching icon area 41, and the coverage area 51 can be displayed in the form of a satellite map, for instance.

Step S202 may include acquiring a current position of the unmanned aerial vehicle and an image captured by an image capturing device of the unmanned aerial vehicle.

In embodiments of the present disclosure, the real-time display device of a three-dimensional point cloud may acquire the current position of the unmanned aerial vehicle and the image captured by the image capturing device of the unmanned aerial vehicle.

Step S203 may include determining, based upon the image, a three-dimensional point cloud corresponding to at least a portion of the target shooting area.

In embodiments of the present disclosure, the real-time display device of a three-dimensional point cloud may determine the three-dimensional point cloud corresponding to the at least a portion of the target shooting area based upon the image.

In some embodiments, when the real-time display device of the three-dimensional point cloud determines the three-dimensional point cloud corresponding to the at least a portion of the target shooting area based upon the image, the real-time display device may determine an initial three-dimensional point cloud corresponding to the at least a portion of the target shooting area, sample the initial three-dimensional point cloud to obtain an updated three-dimensional point cloud with different levels, where three-dimensional point clouds at different levels in the updated three-dimensional point cloud satisfy different sampling interval requirements, and store the updated three-dimensional point cloud, for instance, in nodes of a tree structure.

In some embodiments, the initial three-dimensional point cloud may be obtained through a three-dimensional reconstruction. For example, a method for obtaining the initial three-dimensional point cloud may include: obtaining a two-dimensional picture generated from the at least a portion of the target shooting area; and reconstructing the two-dimensional picture by using a three-dimensional reconstruction algorithm to generate the initial three-dimensional point cloud, where the two-dimensional picture may be a two-dimensional picture set including a plurality of two-dimensional pictures. The two-dimensional picture set may be a picture set obtained by shooting a target area or a target object from multiple angles. According to the embodiments of the present disclosure, the image capturing device for photographing the two-dimensional picture set is not limited, and may be any image capturing device, such as a camera. The image capturing device may be an image capturing device in different platforms such as an unmanned aerial vehicle, a vehicle, an airplane, etc. As an example, the image capturing device may be an image capturing device of the unmanned aerial vehicle.

In some embodiments, when the initial three-dimensional point cloud is sampled to obtain an updated three-dimensional point cloud with different levels, three-dimensional point clouds of different levels in the updated three-dimensional point cloud can satisfy different sampling interval requirements. Through sampling, the number of three-dimensional point clouds that may need to be displayed can be reduced, and there may be no need to load all the data at one time, which can increase the rendering speed and make the display more smooth.

In one embodiment, as an object or model moves away from or approaches a viewer, different levels of three-dimensional point cloud may be displayed. When the object is very close to the viewpoint of the viewer, a finer level may be displayed, and when the object is far away from the viewpoint of the viewer, a coarser level may be displayed without causing visual quality degradation. Furthermore, when the object is outside the visible range of the viewer, rendering may no longer be required. As a result, there may be no need to load all the data at once, so that the display may become smoother.

For example, the initial three-dimensional point cloud may be sampled according to any suitable method, such as random sampling, Poisson disk sampling, and the like. In this regard, the method of embodiments of the present disclosure is mainly described by taking Poisson disk sampling as an example.

In some embodiments, the updated three-dimensional point cloud can include a first level to an nth level, wherein each level can have a three-dimensional point cloud with a different degree of fineness, for example, the first level is the coarsest level, and the nth level is the finest level, where the value of n can be any integer greater than or equal to 2, and the specific number of levels can be set reasonably according to actual needs, which, to some extent, is specifically described herein.

In certain embodiments, the distance between two three-dimensional point cloud points within any one level can be greater than or equal to a preset sampling interval, and different levels can correspond to different preset sampling intervals, for example, from the first level to the nth level, the value of the preset sampling interval can be sequentially decreased, and further, for example, the preset sampling interval of the nth level can be one-half of the preset sampling interval of the n-1th level. In an example, the preset sampling interval of the nth level can be equal to a ground sample distance (GSD), where the ground sample distance can represent an actual distance represented by one pixel. By sequentially reducing the preset sampling interval, the updated point clouds from the first level to the nth level can have different degrees of fineness.

In one embodiment, the updated three-dimensional point cloud can be divided into three levels, and the sampling of the initial three-dimensional point cloud to obtain the updated three-dimensional point cloud with different levels may include: placing three-dimensional point clouds whose point cloud interval is greater than or equal to a first preset sampling interval in the initial three-dimensional point cloud to a first level, for example, placing 200 three-dimensional point clouds whose point cloud interval is greater than or equal to the first preset sampling interval in the initial three-dimensional point cloud containing 4200 three-dimensional point clouds to the first level; placing three-dimensional point clouds whose point cloud interval is greater than or equal to a second preset sampling interval in the three-dimensional point clouds other than the first level to a second level, for example, placing 800 three-dimensional point clouds whose point cloud interval is greater than or equal to the second preset sampling interval in the three-dimensional point clouds other than the first level to the second level; placing three-dimensional point clouds other than the first level and the second level to a third level, for example, placing the remaining 3,200 three-dimensional point clouds to the third level to obtain the updated three dimensional point cloud with three levels, or placing three-dimensional point clouds whose point cloud interval is greater than or equal to a third preset sampling interval in the three-dimensional point clouds other than the first level and the second level to the third level to obtain the updated three-dimensional point cloud with three levels. Wherein, the first preset sampling interval can be greater than the second preset sampling interval, and the second preset sampling interval can be greater than the third preset sampling interval. In one example, the second preset sampling interval may be one-half of the first preset sampling interval, the third preset sampling interval may be one-half of the second preset sampling interval. In another example, the third preset sampling interval may be equal to a ground sample distance (GSD). By setting the sampling interval of the finest level to the ground sampling distance, the target area information can be accurately restored when displaying the three-dimensional point cloud of the finest layer.

In some embodiments, the updated three-dimensional point cloud can be stored in nodes of a tree structure. To increase the loading speed of a three-dimensional point cloud of each node, the number of three-dimensional point clouds stored in each node of the tree structure may be less than a preset point cloud number, such as less than 7000 three-dimensional point clouds, so that when loading the three-dimensional point cloud of each node, it will not exceed a preset file size, for example, it will not exceed 1 Mb. The values of the preset point cloud number and/or the preset file size can be set according to the computing power of a computer.

In certain embodiments, when the method of the present disclosure is used in a surveying and mapping scene, the variation range of a height direction can be generally much smaller than the variation range of a horizontal direction, so only the horizontal direction (for example, east, north) may be sampled.

Figure 6:
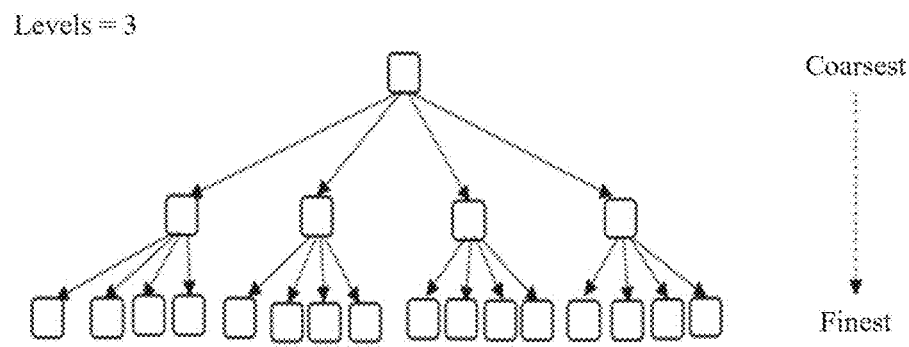
FIG. 6 illustrates a schematic diagram of a three-level quadtree structure according to some embodiments of the present disclosure.

In some embodiments, the tree structure may be any suitable tree structure, such as a binary tree, a trinomial tree, a quadtree, an octree, etc. In illustrative embodiments of the present disclosure, a quadtree is mainly used as an example for explanation and instructions. For example, for each updated three-dimensional point cloud, it can be stored in a quadtree structure. For example, FIG. 6 illustrates a schematic diagram of a three-level quadtree structure according to some embodiments of the present disclosure. In the three-level quadtree structure as shown in FIG. 6, each parent node in the quadtree structure can have four child nodes.

After the above sampling, the updated point cloud can be stored in the nodes of the tree structure. In one embodiment, taking an updated point cloud of three levels as an example, storing the updated point cloud in the nodes of the tree structure may include: storing a point cloud of the first level in a root node of the tree structure, wherein each parent node in the tree structure can have m child nodes, and m can be a positive integer greater than or equal to 2, for example, each parent node of a quadtree can have 4 child nodes; dividing a point cloud of the second level into m (for example, 4) grids, and storing a point cloud of each grid in the m grids in m (for example, 4) first child nodes under the root node, respectively, wherein each grid can correspond to a child node; and dividing a point cloud of the third level into m×m (for example, 16) grids, storing a point cloud of each grid in the m×m grids in m×m second child nodes under the m first child nodes as the parent node, respectively, wherein each grid can correspond to a second child node. Through the above method, the point cloud can be stored in the form of the tree structure.

Figure 7:
FIG. 7 illustrates a schematic diagram after alignment of a point cloud and real geographic information according to some embodiments of the present disclosure.

In some embodiments, the three-dimensional point cloud can be a three-dimensional point cloud transformed into a world coordinate system, and the world coordinate system can include an earth-centered earth-fixed coordinate system. In certain embodiments, in order to fit three-dimensional point cloud information with real geographic information, the coordinate system of the updated three-dimensional point cloud can be transformed into a world coordinate system, wherein the world coordinate system can include an earth-centered earth-fixed coordinate system. For example, a local coordinate system of the updated three-dimensional point cloud (for example, east-north-sky) can be transformed to an earth-centered earth-fixed coordinate system (for example, the WGS 84 coordinate system). Specifically, the coordinate system transformation can be realized by any suitable method, for example, calculating a transformation matrix from a local coordinate system (for example, east-north-sky) of the updated three-dimensional point cloud to an earth-centered earth-fixed coordinate system (for example, the WGS 84 coordinate system), and automatically transforming the three-dimensional point cloud when loading the three-dimensional point cloud. As shown in the area indicated by the arrow in FIG. 7, for instance, FIG. 7 illustrates a schematic diagram after alignment of a point cloud and real geographic information according to some embodiments of the present disclosure. By transforming the three-dimensional point cloud into a world coordinate system, the real-time displayed three-dimensional point cloud can fit together with the real geographic information, so that a user can inspect the effect of a model reconstruction in a timely and intuitive manner. Thus, an area that cannot be reconstructed or the reconstruction effect is not good can be immediately identified, so that the target area can be re-photographed at the surveying and mapping site, saving manpower and time cost.

Step S204 may include, while the unmanned aerial vehicle moves according to the flight route, synchronously displaying the current position of the unmanned aerial vehicle and the three-dimensional point cloud, wherein a display icon corresponding to the current position can be located on the flight route.

In embodiments of the present disclosure, the real-time display device of a three-dimensional point cloud may synchronously display the current position of the unmanned aerial vehicle and the three-dimensional point cloud while the unmanned aerial vehicle is moving according to the flight route, wherein a display icon corresponding to the current position can be located on the flight route.

In some embodiments, when the real-time display device of the three-dimensional point cloud synchronously displays the flight route, the position of the unmanned aerial vehicle, and the three-dimensional point cloud, the flight route, the position of the unmanned aerial vehicle, and a three-dimensional point cloud of at least one node in the tree structure can be displayed synchronously. As such, a user can more clearly see the flight route of the unmanned aerial vehicle, the current position of the unmanned aerial vehicle, and the three-dimensional point cloud. And the display effect can be better, which may be helpful to improve operation efficiency of the unmanned aerial vehicle during operation.

Figure 9A:
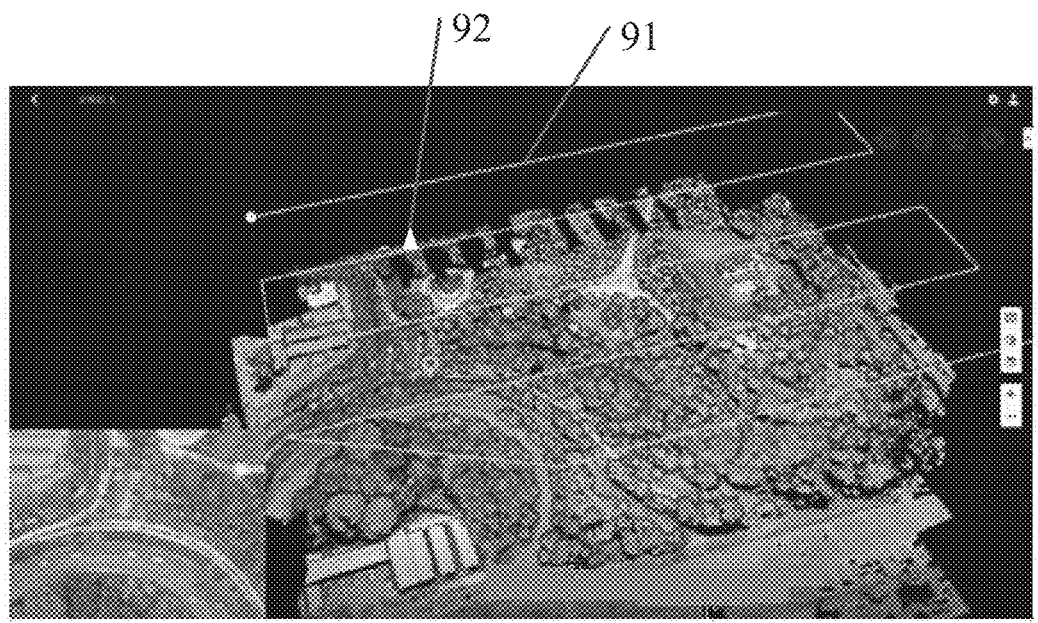
FIG. 9a illustrates a schematic diagram of a three-dimensional point cloud display according to some embodiments of the present disclosure.

FIG. 9a illustrates a schematic diagram of a three-dimensional point cloud display according to some embodiments of the present disclosure. The real-time display device of a three-dimensional point cloud may synchronously display a current position 92 of the unmanned aerial vehicle and a three-dimensional point cloud while the unmanned aerial vehicle moves according to a flight route 91. The display effect is shown in FIG. 9*a*.

Figure 9B:
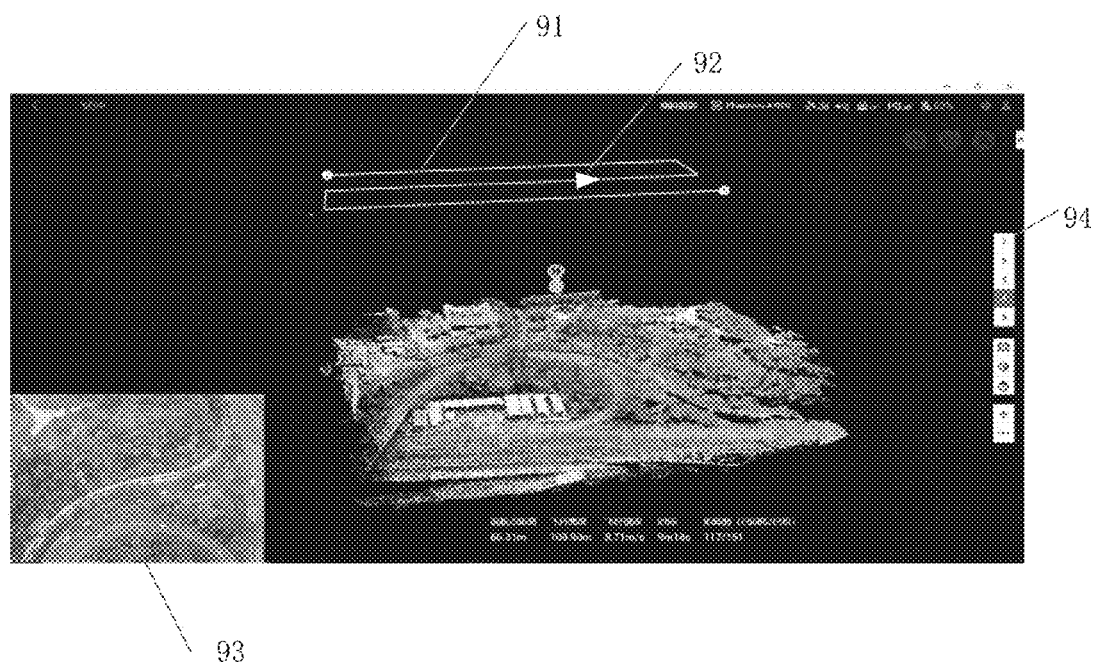
FIG. 9b illustrates a schematic diagram of a three-dimensional point cloud display according to some embodiments of the present disclosure.

FIG. 9*b* illustrates a schematic diagram of another three-dimensional point cloud display according to some embodiments of the present disclosure. The real-time display device of a three-dimensional point cloud may synchronously display a current position 92 of the unmanned aerial vehicle and a three-dimensional point cloud while the unmanned aerial vehicle moves according to a flight route 91. At the same time, a two-dimensional map 93 corresponding to the target shooting area and a route switching icon 94 may also be displayed. A user can view the obstacle situation in the target shooting area through the two-dimensional map 93, and switch and display different flight routes through an operation on the route switching icon 94.

Therefore, by displaying the flight route corresponding to the target shooting area of the unmanned aerial vehicle, acquiring the current position of the unmanned aerial vehicle and the image captured by the image capturing device of the unmanned aerial vehicle, determining the three-dimensional point cloud corresponding to at least a portion of the target shooting area based upon the images, and displaying the current position of the unmanned aerial vehicle and the three-dimensional point cloud while the unmanned aerial vehicle moves according to the flight route synchronously, the real-time display of the three-dimensional point cloud can be achieved, which can enable a user to inspect the three-dimensional point cloud in real time, and which can improve operation efficiency.

Figure 8:
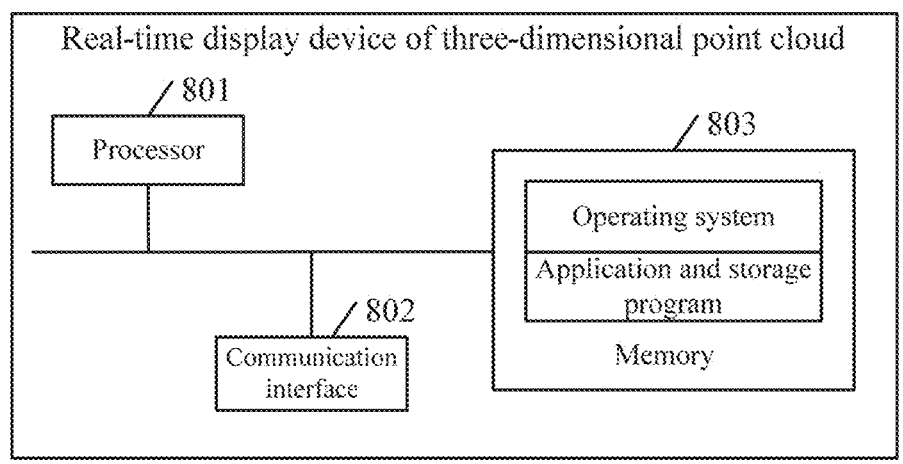
FIG. 8 illustrates a schematic structural diagram of a real-time display device for a three-dimensional point cloud according to some embodiments of the present disclosure.

FIG. 8 illustrates a schematic structural diagram of a real-time display device for a three-dimensional point cloud according to some embodiments of the present disclosure. The real-time display device of the three-dimensional point cloud may include a processor 801 and a memory 803.

In some embodiments, the real-time display device of the three-dimensional point cloud may further include a communication interface 802 to transmit data information between the real-time display device of the three-dimensional point cloud and other devices.

The memory 803 may include a volatile memory, a non-volatile memory, or a combination thereof. The processor 801 may be a central processing unit (CPU). The processor 801 may further include a hardware chip. The hardware chip may be an application-specific integrated circuit (ASIC), a programmable logic device (PLD), or a combination thereof. The PLD may be a complex programmable logic device (CPLD), a field-programmable gate array (FPGA), or any combination thereof.

The memory 803 is configured to have stored programs therein, and the processor 801 can be configured to call the programs stored in the memory 803 to:
   display a flight route corresponding to a target shooting area of an unmanned aerial vehicle;
   acquire a current position of the unmanned aerial vehicle and an image captured by an image capturing device of the unmanned aerial vehicle;
   determine, based upon the image, a three-dimensional point cloud corresponding to at least a portion of the target shooting area; and
   while the unmanned aerial vehicle moves according to the flight route, display the current position of the unmanned aerial vehicle and the three-dimensional point cloud synchronously, wherein a display icon corresponding to the current position is located on the flight route.

In one embodiment, before the processor 801 can be configured to display the flight route corresponding to the target shooting area of the unmanned aerial vehicle, the processor 801 is configured to:
   display a two-dimensional map;
   determine the target shooting area based upon a point selection operation of a user on the two-dimensional map; and
   generate the flight route corresponding to the target shooting area.

In one embodiment, when the processor 801 can be configured to determines the target shooting area based upon the point selection operation of the user on the two-dimensional map, the processor 801 can be configured to:
   acquire the point selection operation of the user on the two-dimensional map;
   determine at least three boundary points based upon the point selection operation; and
   determine the target shooting area based upon the at least three boundary points, wherein the target shooting area is formed by connecting the at least three boundary points in pairs.

In one embodiment, when the processor 801 is configured to generate the flight route corresponding to the target shooting area, the processor 801 can be configured to:
   acquire shooting control information input by the user, the shooting control information including one or more of a relative height, a mission height, an overlap ratio, a main route angle, and a margin; and
   generate the flight route corresponding to the target shooting area based upon the shooting control information, wherein, the relative height is a distance between a take-off plane of the unmanned aerial vehicle and a plane where the target shooting area is located, the mission height is a distance between a plane where the flight route is located and the plane where the target shooting area is located; a starting plane for computing the overlap ratio is the plane where the target shooting area is located; the overlap ratio includes a heading overlap ratio and a side overlap ratio, the heading overlap ratio is an image overlap ratio corresponding to a main route, and the side overlap ratio is an image overlap ratio corresponding to adjacent main routes; the main route angle is an angle between the main route and a reference direction; and the margin is a distance of a starting or an ending point of the flight route with respect to a boundary of the target shooting area.

In one embodiment, the plane where the flight route is located can be determined based upon the relative height and the mission height; and a distance between adjacent main routes in the flight route can be determined based on the side overlap ratio.

In one embodiment, the flight route can include a plurality of flight routes, and the processor 801 can be further configured to:
   display a route switching icon; and
   switch and display different flight routes based upon an operation of a user on the route switching icon.

In one embodiment, the flight route can includes a first-type flight route and a second-type flight route, and when the unmanned aerial vehicle is flying according to the first-type route, an attitude of the image capturing device can be downward; when the unmanned aerial vehicle is flying according to the second type of route, the attitude of the image capturing device can be toward the target shooting area and has an inclination angle.

A relative position of the second-type flight route and the first-type flight route can be determined based upon the inclination angle and the mission height.

In one embodiment, the processor 801 can be further configured to:

display a coverage area corresponding to the plurality of flight routes and a satellite map including the coverage areas, the coverage area being larger than the target shooting area.

In one embodiment, when the processor 801 is configured to determine the three-dimensional point cloud corresponding to the at least a portion of the target shooting area based upon the image, the processor 801 can be configured to:

determine, based upon the image, an initial three-dimensional point cloud corresponding to the at least a portion of the target shooting area;

sample the initial three-dimensional point cloud to obtain an updated three-dimensional point cloud with different levels, wherein three-dimensional point clouds of different levels in the updated three-dimensional point cloud satisfy different sampling interval requirements; and store the updated three-dimensional point cloud in nodes of a tree structure.

In one embodiment, when the processor 801 is configured to synchronously display the flight route, the position of the unmanned aerial vehicle, and the three-dimensional point cloud, the processor 801 can be configured to:

synchronously display the flight route, the position of the unmanned aerial vehicle, and a three-dimensional point cloud of at least one node in the tree structure.

In one embodiment, the three-dimensional point cloud can be a three-dimensional point cloud transformed to a world coordinate system, and the world coordinate system can include an earth-centered and earth-fixed coordinate system.

Therefore, by displaying the flight route corresponding to the target shooting area of the unmanned aerial vehicle, acquiring the current position of the unmanned aerial vehicle and the image captured by the image capturing device of the unmanned aerial vehicle, and determining the three-dimensional point cloud corresponding to at least a portion of the target shooting area based upon the image. In this way, the current position of the unmanned aerial vehicle and the three-dimensional point cloud may be displayed synchronously while the unmanned aerial vehicle moves according to the flight path, so that the real-time display of the three-dimensional point cloud can be achieved, which can enable a user to inspect the three-dimensional point cloud in real time, and which can improve operation efficiency.

Embodiments of the present disclosure can also provide or implement a real-time display system for a three-dimensional point cloud. The real-time display system may include an unmanned aerial vehicle equipped with an image capturing device for capturing images of an environment and the real-time display device of a three-dimensional point cloud described above. In embodiments of the present disclosure, by displaying a flight route corresponding to a target shooting area of the unmanned aerial vehicle, acquiring a current position of the unmanned aerial vehicle and an image captured by the image capturing device of the unmanned aerial vehicle, determining a three-dimensional point cloud corresponding to at least a portion of the target shooting area based upon the image, and displaying synchronously the current position of the unmanned aerial vehicle and the three-dimensional point cloud while the unmanned aerial vehicle moves according to the flight route, the real-time display system can realize the real-time display of the three-dimensional point cloud, which can enable a user to inspect the three-dimensional point cloud in real time, and which can improve operation efficiency.

Embodiments of the present disclosure can further provide or implement a computer-readable storage medium (non-transitory), the computer-readable storage medium can store a computer program, and when the computer program is executed by a processor, it may implement the method described in corresponding embodiments of FIG. 2, or the device of corresponding embodiments of FIG. 8, which will not be repeated herein for conciseness.

Therefore, embodiments of the present disclosure may display a flight route corresponding to a target shooting area of an unmanned aerial vehicle, acquire a current position of the unmanned aerial vehicle and an image captured by an image capturing device of the unmanned aerial vehicle, and determine a three-dimensional point cloud corresponding to at least a portion of the targeted shooting area based upon the image so that the current position of the unmanned aerial vehicle and the three-dimensional point cloud are synchronously displayed while the unmanned aerial vehicle moves according to the flight route, where a display icon corresponding to the current position is located on the flight route. As such, real-time display of the three-dimensional point cloud can be realized, so that a user can inspect the three-dimensional point cloud in real time, which improves operation efficiency.

The computer-readable storage medium, which may be non-transitory, may be an internal storage unit of the device described in any of the foregoing embodiments, such as a hard disk or memory of the device. The computer-readable storage medium may also be an external storage device of the device, such as a plug-in hard disk equipped on the device, a smart memory card (SMC), or a secure digital (SD) card, a flash card, etc. Further, the computer-readable storage medium may also include both an internal storage unit of the device and an external storage device. The computer-readable storage medium is used to store a computer program and other programs and data required by the device. The computer-readable storage medium can also be used to temporarily store data that has been output or will be output.

The computer readable storage medium may be a tangible device that can store programs and instructions for use by an instruction execution device (processor). The computer readable storage medium may be, for example, but is not limited to, an electronic storage device, a magnetic storage device, an optical storage device, an electromagnetic storage device, a semiconductor storage device, or any appropriate combination of these devices. A non-exhaustive list of more specific examples of the computer readable storage medium includes each of the following (and appropriate combinations): flexible disk, hard disk, solid-state drive (SSD), random access memory (RAM), read-only memory (ROM), erasable programmable read-only memory (EPROM or Flash), static random access memory (SRAM), compact disc (CD or CD-ROM), digital versatile disk (DVD) and memory card or stick. A computer readable storage medium, as used in this disclosure, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described in this disclosure can be downloaded to an appropriate computing or processing device from a computer readable storage medium or to an external computer or external storage device via a global network (i.e., the Internet), a local area network, a wide area network and/or a wireless network. The network may include copper transmission wires, optical communication fibers, wireless transmission, routers, firewalls, switches, gateway computers and/or edge servers. A network adapter card or network interface in each computing or processing device may receive computer readable program instructions from the network and forward the computer readable program instructions for storage in a computer readable storage medium within the computing or processing device.

Computer readable program instructions for carrying out operations of the present disclosure may include machine language instructions and/or microcode, which may be compiled or interpreted from source code written in any combination of one or more programming languages, including assembly language, Basic, Fortran, Java, Python, R, C, C++, C# or similar programming languages. The computer readable program instructions may execute entirely on a user's personal computer, notebook computer, tablet, or smartphone, entirely on a remote computer or computer server, or any combination of these computing devices. The remote computer or computer server may be connected to the user's device or devices through a computer network, including a local area network or a wide area network, or a global network (i.e., the Internet). In some embodiments, electronic circuitry including, for example, programmable logic circuitry, field-programmable gate arrays (FPGA), or programmable logic arrays (PLA) may execute the computer readable program instructions by using information from the computer readable program instructions to configure or customize the electronic circuitry, in order to perform aspects of the present disclosure.

The computer readable program instructions that may implement the device/systems and methods described in this disclosure may be provided to one or more processors (and/or one or more cores within a processor) of a general purpose computer, special purpose computer, or other programmable apparatus to produce a machine, such that the instructions, which execute via the processor of the computer or other programmable apparatus, create a system for implementing the functions specified in the flow diagrams and block diagrams in the present disclosure. These computer readable program instructions may also be stored in a computer readable storage medium that can direct a computer, a programmable apparatus, and/or other devices to function in a particular manner, such that the computer readable storage medium having stored instructions is an article of manufacture including instructions which implement aspects of the functions specified in the flow diagrams and block diagrams in the present disclosure.

The computer readable program instructions may also be loaded onto a computer, other programmable apparatus, or other device to cause a series of operational steps to be performed on the computer, other programmable apparatus or other device to produce a computer implemented process, such that the instructions which execute on the computer, other programmable apparatus, or other device implement the functions specified in the flow diagrams and block diagrams in the present disclosure.

Aspects of the present disclosure are described herein with reference to flow diagrams and block diagrams of methods, apparatus (systems), and computer program products according to embodiments of the disclosure. It will be understood by those skilled in the art that each block of the flow diagrams and block diagrams, and combinations of blocks in the flow diagrams and block diagrams, can be implemented by computer readable program instructions.

The processor may be one or more single or multi-chip microprocessors, such as those designed and/or manufactured by Intel Corporation, Advanced Micro Devices, Inc. (AMD), Arm Holdings (Arm), Apple Computer, etc. Examples of microprocessors include Celeron, Pentium, Core i3, Core i5 and Core i7 from Intel Corporation; Opteron, Phenom, Athlon, Turion and Ryzen from AMD; and Cortex-A, Cortex-R and Cortex-M from Arm.

The memory and non-volatile storage medium may be computer-readable storage media. The memory may include any suitable volatile storage devices such as dynamic random access memory (DRAM) and static random access memory (SRAM). The non-volatile storage medium may include one or more of the following: flexible disk, hard disk, solid-state drive (SSD), read-only memory (ROM), erasable programmable read-only memory (EPROM or Flash), compact disc (CD or CD-ROM), digital versatile disk (DVD) and memory card or stick.

The program may be a collection of machine readable instructions and/or data that is stored in non-volatile storage medium and is used to create, manage and control certain software functions that are discussed in detail elsewhere in the present disclosure and illustrated in the drawings. In some embodiments, the memory may be considerably faster than the non-volatile storage medium. In such embodiments, the program may be transferred from the non-volatile storage medium to the memory prior to execution by a processor.

Each part of the present disclosure may be implemented by hardware, software, firmware, or a combination thereof. In the above exemplary embodiments, multiple steps or methods may be implemented by hardware or software stored in a memory and executed by a suitable instruction execution system.

The terms used herein are only for the purpose of describing specific embodiments and are not intended to limit of the disclosure. As used in this disclosure and the appended claims, the singular forms "a," "an," and "the" are intended to include the plural forms as well, unless the context clearly indicates otherwise. It should also be understood that the term "and/or" as used herein refers to and encompasses any or all possible combinations of one or more associated listed items. Terms such as "connected" or "linked" are not limited to physical or mechanical connections, and may include electrical connections, whether director indirect. Phrases such as "a plurality of," "multiple," or "several" mean two and more.

It should be noted that in the instant disclosure, relational terms such as "first" and "second", etc. are used herein merely to distinguish one entity or operation from another entity or operation without necessarily requiring or implying any such actual relationship or order between such entities or operations. The terms "comprise/comprising", "include/including", "has/have/having" or any other variants thereof are intended to cover non-exclusive inclusion, so that a process, method, article, or device that includes a series of elements includes not only those elements, but also other elements that are not explicitly listed, or also includes elements inherent to such processes, methods, articles, or equipment. If there are no more restrictions, the element defined by the phrase, such as "comprising a . . . ", "including a . . . " does not exclude the presence of additional identical elements in the process, method, article, or equipment that includes the element.

Finally, it should be noted that the above embodiments/ examples are only used to illustrate the technical features of the present disclosure, not to limit them; although the present disclosure has been described in detail with reference to the foregoing embodiments and examples, those of ordinary skill in the art should understand that: the technical features disclosed in the foregoing embodiments and examples can still be modified, some or all of the technical features can be equivalently replaced, but, these modifications or replacements do not deviate from the spirit and scope of the disclosure.

What is claimed is:

1. A real-time display device comprising:
a memory; and
at least one processor, the memory configured to store a program, and the at least one processor configured to execute the program stored in the memory, and when the program is executed by the at least one processor, is configured to:
display a movement route corresponding to a target shooting area of an aerial vehicle;
obtain a current position of the aerial vehicle and an image captured by an image capturing device of the aerial vehicle with the aerial vehicle at the current position;
determine, based upon the image captured by the image capturing device with the aerial vehicle at the current position, a three-dimensional point cloud corresponding to at least a portion of the target shooting area; and
display, in real-time and synchronously, the obtained current position of the aerial vehicle and the determined three-dimensional point cloud corresponding to at least the portion of the target shooting area,
wherein a display icon corresponding to the current position of the aerial vehicle is located on the displayed movement route.

2. The real-time display device of claim 1, wherein the at least one processor is further configured to, before displaying the movement route corresponding to the target shooting area of the aerial vehicle:
display a two-dimensional map;
determine the target shooting area based upon a selection operation of a user on the two-dimensional map; and
generate the movement route corresponding to the target shooting area.

3. The real-time display device of claim 1, wherein the at least one processor is configured to:
obtain shooting control information input by a user, the shooting control information including one or more of a relative height, a mission height, an overlap ratio, a main route angle, and a margin; and
generate the movement route corresponding to the target shooting area based upon the shooting control information,
wherein, the relative height is a distance between a take-off plane of the aerial vehicle and a plane where the target shooting area is located; the mission height is a distance between a plane where the movement route is located and the plane where the target shooting area is located; a starting plane for computing the overlap ratio is the plane where the target shooting area is located; the overlap ratio includes a heading overlap ratio and a side overlap ratio, the heading overlap ratio is an image overlap ratio corresponding to a main route, and the side overlap ratio is an image overlap ratio corresponding to adjacent main routes; the main route angle is an angle between the main route and a reference direction; and the margin is a distance of a starting or an ending point of the movement route with respect to a boundary of the target shooting area.

4. The real-time display device of claim 2, wherein the at least one processor is configured to:
acquire a point selection operation of the user on the two-dimensional map;
determine at least three boundary points based upon the point selection operation; and
determine the target shooting area based upon the at least three boundary points,
wherein the target shooting area is formed by connecting the at least three boundary points in pairs.

5. The real-time display device of claim 1, wherein the movement route comprises a first-type movement route and a second-type movement route, wherein, when the aerial vehicle is moving according to the first-type movement route, an attitude of the image capturing device is downward; and when the aerial vehicle is flying according to the second type of movement route, the attitude of the image capturing device is toward the target shooting area and has an inclination angle.

6. The real-time display device of claim 5, wherein a relative position between the second type of movement route and the first type of movement route is determined based upon the inclination angle and the mission height.

7. The real-time display device of claim 1, wherein
the aerial vehicle is an unmanned aerial vehicle; and/or
the movement route comprises a flight route.

8. The real-time display device of claim 1,
wherein the determining the three-dimensional point cloud corresponding to the at least the portion of the target shooting area based upon the image includes:
determining, based upon the image, an initial three-dimensional point cloud corresponding to the at least the portion of the target shooting area, and
sampling the initial three-dimensional point cloud to obtain an updated three-dimensional point cloud with different levels, and
wherein three-dimensional point clouds of different levels in the updated three-dimensional point cloud satisfy different sampling interval requirements.

9. The real-time display device of claim 1, wherein the movement route comprises a plurality of movement routes, and the at least one processor is further configured to:
display a route switching icon; and
switch and display different movement routes based upon an operation of a user on the route switching icon.

10. The real-time display device of claim 9, wherein the at least one processor is further configured to display a coverage area corresponding to the plurality of movement routes and a satellite map comprising the coverage area, the coverage area being larger than the target shooting area.

11. A method regarding a real-time display device, the method comprising:
displaying, using the real-time display device, a movement route corresponding to a target shooting area of an aerial vehicle;
obtaining a current position of the aerial vehicle and an image captured by an image capturing device of the aerial vehicle with the aerial vehicle at the current position;
determining, based upon the image captured by the image capturing device with the aerial vehicle at the current position, a three-dimensional point cloud corresponding to at least a portion of the target shooting area; and
displaying, using the real-time display device, in real-time and synchronously, the obtained current position of the aerial vehicle and the determined three-dimensional point cloud corresponding to at least the portion of the target shooting area,
wherein a display icon corresponding to the current position of the aerial vehicle is located on the displayed movement route.

12. The method of claim 11, further comprising, before displaying the movement route corresponding to the target shooting area of the aerial vehicle:
displaying a two-dimensional map;
determining the target shooting area based upon a selection operation of a user on the two-dimensional map; and
generating the movement route corresponding to the target shooting area.

13. The method of claim 12, wherein said determining the target shooting area based upon the selection operation of the user on the two-dimensional map includes:
acquiring a point selection operation of the user on the two-dimensional map;
determining at least three boundary points based upon the point selection operation; and
determining the target shooting area based upon the at least three boundary points, wherein the target shooting area is formed by connecting the at least three boundary points in pairs.

14. The method of claim 11, further comprising:
obtaining shooting control information input by a user, the shooting control information including one or more of a relative height, a mission height, an overlap ratio, a main route angle, and a margin; and
generating the movement route corresponding to the target shooting area based upon the shooting control information,
wherein, the relative height is a distance between a take-off plane of the aerial vehicle and a plane where the target shooting area is located; the mission height is a distance between a plane where the movement route is located and the plane where the target shooting area is located; a starting plane for computing the overlap ratio is the plane where the target shooting area is located; the overlap ratio includes a heading overlap ratio and a side overlap ratio, the heading overlap ratio is an image overlap ratio corresponding to a main route, and the side overlap ratio is an image overlap ratio corresponding to adjacent main routes; the main route angle is an angle between the main route and a reference direction; and the margin is a distance of a starting or an ending point of the movement route with respect to a boundary of the target shooting area.

15. The method of claim 11, wherein the movement route comprises a first-type movement route and a second-type movement route, wherein, when the aerial vehicle is moving according to the first-type movement route, an attitude of the image capturing device is downward; and when the aerial vehicle is flying according to the second type of movement route, the attitude of the image capturing device is toward the target shooting area and has an inclination angle.

16. The method of claim 15, wherein a relative position between the second type of movement route and the first type of movement route is determined based upon the inclination angle and the mission height.

17. The method of claim 11, wherein
the aerial vehicle is an unmanned aerial vehicle; and/or
the movement route comprises a flight route.

18. The method of claim 11,
wherein said determining the three-dimensional point cloud corresponding to the at least the portion of the target shooting area based upon the image includes:
determining, based upon the image, an initial three-dimensional point cloud corresponding to the at least the portion of the target shooting area, and
sampling the initial three-dimensional point cloud to obtain an updated three-dimensional point cloud with different levels, and
wherein three-dimensional point clouds of different levels in the updated three-dimensional point cloud satisfy different sampling interval requirements.

19. The method of claim 11, wherein the movement route comprises a plurality of movement routes, and the method further comprises:
displaying a route switching icon; and
switching and displaying different movement routes based upon an operation of a user on the route switching icon.

20. The method of claim 19, further comprising displaying a coverage area corresponding to the plurality of movement routes and a satellite map comprising the coverage area, the coverage area being larger than the target shooting area.

* * * * *